T. SLOPER.
VEHICLE TIRE.
APPLICATION FILED MAR. 30, 1920.
1,365,350.
Patented Jan. 11, 1921.
2 SHEETS—SHEET 1.
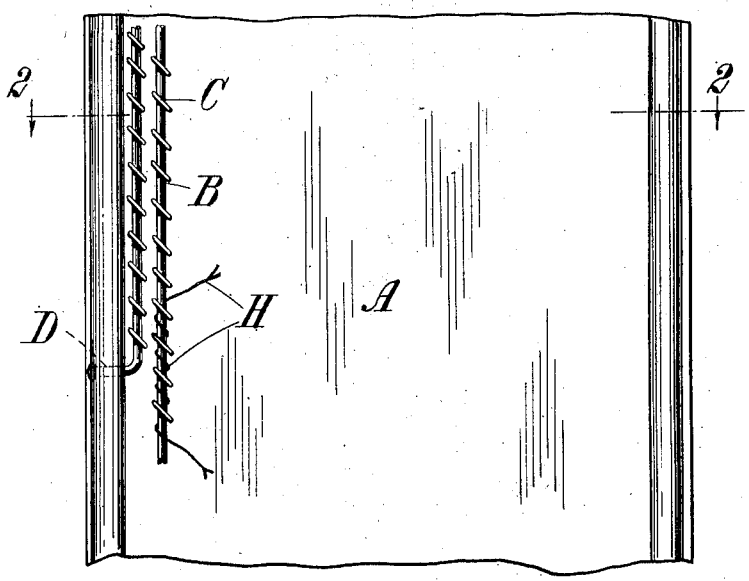
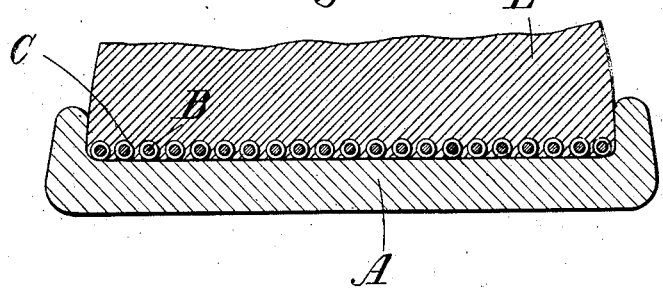

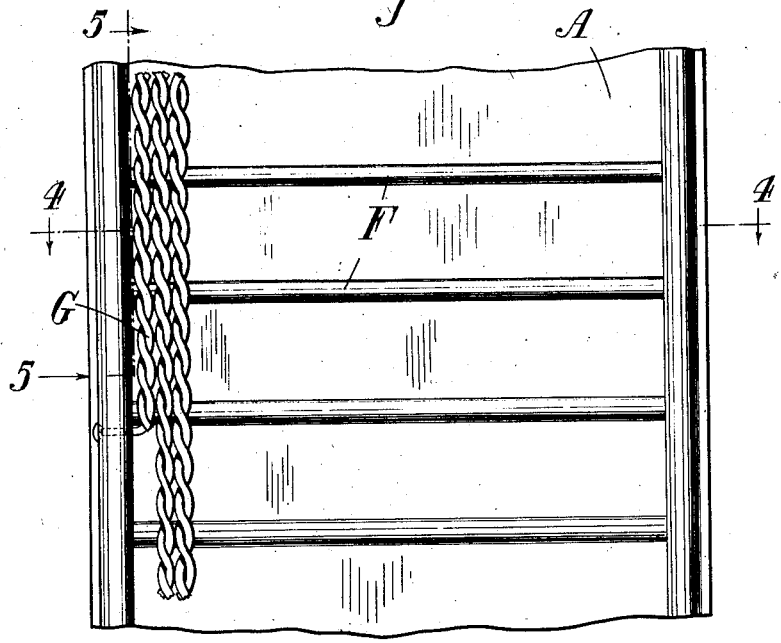
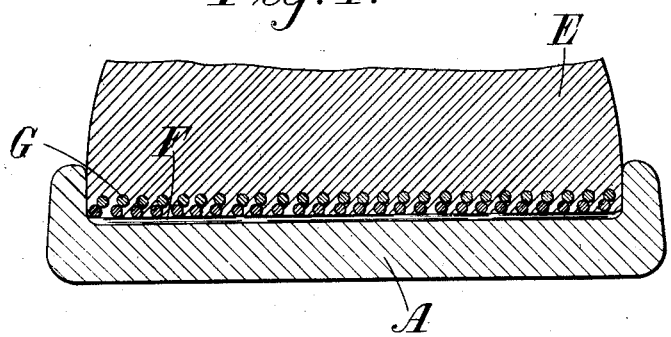
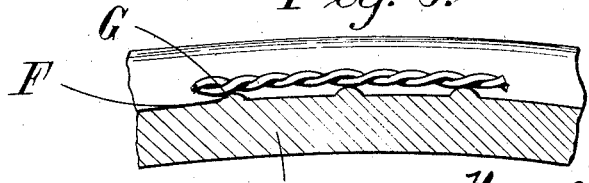

UNITED STATES PATENT OFFICE.

THOMAS SLOPER, OF DEVIZES, ENGLAND.

VEHICLE-TIRE.

1,365,350.    Specification of Letters Patent.    Patented Jan. 11, 1921.

Application filed March 30, 1920. Serial No. 369,874.

*To all whom it may concern:*

Be it known that I, THOMAS SLOPER, a subject of the King of England, residing at Southgate, Devizes, Wiltshire, England, have invented certain new and useful Improvements in Vehicle-Tires, of which the following is a specification.

This invention relates to tires for vehicles and the manufacture of the same, and has for its main object to provide means whereby the rubber portion of the tire shall be more firmly secured to the metal rim of the wheel, or to a metal band if such is used, than was the case heretofore.

As is known, the rubber portion at present is usually secured to the band by being molded into longitudinal key-ways in the outer surface of the band, and the band with the rubber thereon is secured to the wheel by being forced on to the same laterally by hydraulic pressure. This puts a considerable strain on the band, and the bands are, therefore, liable to fracture at the joint; further, the rubber is not as securely held to the band as is desirable, and the making of key-ways in the surface of the band is expensive as this is usually done on a lathe.

A further object of the invention is to obviate these defects.

According to this invention a rim or band is provided with a winding of wire secured on it in one or more layers around its outer face. In a construction of this character the rubber, when built upon the rim or band, is forced in between the wire strands and beneath them so that thorough interlocking is obtained which, when the rubber is vulcanized in the usual way, serves to hold it firmly to the rim or band. Moreover, the wire serves as a reinforcement for the latter and tends to prevent the joint from breaking.

Preferably the rim or band is provided with projections on its outer face, for example in the form of transverse ribs, which projections support the wire winding and serve to raise it above the surface of the rim or band.

The invention consists in the construction, arrangement and combination of parts described hereinafter and pointed out in the claims.

Preferred forms of the invention will now be described as applied to a band tire with reference to the accompanying drawings, although it will be understood that in place of the band the invention could be equally well applied directly to the fixed rim of a wheel or to a detachable rim forming part of the wheel. In either case the invention provides improved means for securing the rubber to the metal band or rim, and at the same time reinforces the latter circumferentially so that a considerable reduction can be made in its weight.

In the accompanying drawings—

Figure 1 illustrates in plan a portion of the rim and wire winding looking down on the outer face of the band, and Fig. 2 is a section taken on the line 2—2 of Fig. 1;

Fig. 3 is a similar view to Fig. 1 of a modified form of band and winding.

Fig. 4 is a section taken on the line 4—4 of Fig. 3, and

Fig. 5 is a section taken on the line 5—5 of a portion of the rim shown in Fig. 3.

Like reference letters indicate like parts throughout the drawings.

In the construction illustrated in Figs. 1 and 2, the band A is shown as a channeled band having circumferential flanges at both edges. Around the outer face of the band a wire B is helically wound with its laps slightly spaced apart. The wire B, is served with, or has wound on it, another wire C of smaller gage, and the latter raises the wire B above the outer surface of the band A.

This form is particularly suitable when the outer surface of the band is smooth, that is to say, is formed without projections upon which to raise the wire.

The two ends of the wire B may be secured in the manner shown at D to the flanges of the band A.

In building up such a band tire the compound wire B, C is applied around the outer face of the band A and the rubber portion E is thereafter built on to the band thus wrapped with wire. The rubber is forced in between the laps of the wire and is finally vulcanized in position, the vulcanization being carried out in the usual manner.

In Figs. 3, 4 and 5, a modified form of the invention is illustrated in which the band A is formed with transverse ribs F projecting from its outer face. The wire which is wound around and supported by the ribs F is shown at G as a stranded wire composed of two strands to afford a better grip for the rubber. A stranded wire provides considerable interstices for the rubber to flow between the different laps. Moreover, it will be seen that by raising the wire on the projecting ribs F the rubber is enabled to flow or to be forced between the laps of the wire and underneath them so as to be interlocked between them and the outer face of the band.

The wire for winding around the band or rim in either of the foregoing constructions may be composed of a single strand, such as B, without the additional winding of wire C or two or more strands, such as the stranded wire G, may be formed of wires of equal or unequal diameters twisted together in the manner indicated in Figs. 3 and 5. It is preferred, however, that the wires should be raised, by one or other of the means hereinbefore shown, above the outer surface of the band or rim.

Furthermore the wires may, if desired, be braided or lapped with fibrous threads, as indicated at H in Fig. 1.

Where the word "rubber" is used above in connection with that portion of the tire which is in contact with or in the proximity of the wire or metal parts, it is to be understood also to include the ebonite or other material which may be employed for the purpose of making a good joint between the metal parts and the rubber.

What I claim as my invention and desire to secure by Letters Patent is:—

1. The combination, with an annular support constituting a rim or band, of a wire that is attached thereto and is wound around its outer face, and an annulus of rubber constituting a portion of a tire secured on the said annular support by said wire, said wire being attached to the support independently of the rubber, substantially as set forth.

2. The combination, with an annular support constituting a rim or band and having transverse projections on its outer face, of a wire that is firmly attached to the support and is wound about the latter on said projections, and an annulus of rubber constituting a portion of a tire secured on the said annular support by said wire, substantially as set forth.

3. The combination, with an annular support constituting a rim or band, of a wire attached thereto and wound in a layer on its outer face, means spacing said wire from the annular support, and an annulus of rubber constituting a portion of a tire secured on the said annular support by said wire, said wire being attached to the support independently of the rubber, substantially as set forth.

4. The combination, with an annular support constituting a rim or band, of a wire that is firmly attached thereto and is wound in a layer on its outer face, a length of material wound about said wire, and an annulus of rubber constituting a portion of a tire secured on said annular support by said wire, said wire being attached to the support independently of the rubber, substantially as set forth.

5. A tire comprising the combination of an annular support constituting a band, a wire that is attached thereto and is wound in a layer about its outer face, and an annulus of rubber around the wire on the annular support, said wire being attached to the support independently of the rubber, substantially as set forth.

6. A tire comprising the combination of an annular support constituting a band, a stranded wire that is attached thereto by its ends and is wound in a layer about its outer face, and an annulus of rubber molded around the wire on the annular support, substantially as set forth.

7. A tire comprising the combination of a flanged supporting band having transverse projections on its periphery, a wire that is firmly attached to said band and is wound about the same in a layer on said projections, and an annulus of rubber molded around the said layer of wire and thereby secured on said band, said wire being attached to the supporting band independently of the rubber, substantially as set forth.

In testimony whereof I affix my signature.

THOMAS SLOPER.